United States Patent Office 3,326,765
Patented June 20, 1967

3,326,765
SPARINGLY-SOLUBLE DERIVATIVE OF THE KALLIKREIN - INACTIVATOR AND PROCESS FOR PRODUCING THE SAME
Fritz Schultz, Wuppertal-Sonnborn, Germany, assignor to Farbenfabriken Bayer Aktiengesellschaft, Leverkusen, Germany, a corporation of Germany
No Drawing. Filed Nov. 12, 1963, Ser. No. 323,091
Claims priority, application Germany, Nov. 14, 1962, F 38,309
6 Claims. (Cl. 167—74)

This invention relates, in general, to a new and improved process for the purification of the inactivator for the circulatory hormone, kallikrein, and for the production of a novel pharmaceutically useful sparingly-soluble derivative of said kallikrein-inactivator (KI).

As is now well-established, the kallikrein-inactivator finds utility as an injectable therapeutic agent for use in the preventive and control therapy of pancreatic disturbances as, for example, for pre- and post-surgical prevention and control of acute pancreatitis stemming from operative complications, and in the control of chronic pancreatitis of non-surgical origin.

It is further well-established at this date that the inactivator of kallikrein can be isolated and recovered from the most diverse animal organs including, for example, the parotid, pancreas, lung, liver, spleen and lymphatic glands, and even the blood. Thus, for example, in German Patent No. 1,084,433 there is described a process for the production of this hormone in which comminuted animal organs containing the same, and preferably the parotid, pancreas, liver or lungs, are extracted with aqueous solutions of salts or hydroxides of an alkaline earth metal or of alkali metal salts, conveniently containing water-miscible organic solvents, and preferably methanol. The resulting extract is precipitated with a ketone, preferably acetone, and in the presence of a finely-subdivided inert carrier substance, the separated precipitate is extracted with water, preferably after drying, the residual protein is quantitatively precipitated from the solution with a suitable protein-precipitating agent such as sulphosalicylic acid, and the excess of the latter agent is then removed from the solution remaining after separation of the precipitate by means of ion-exchangers.

In German Patent No. 1,148,352 there is described another process for the production of the kallikrein-inactivator from the same types of animal organs, wherein use is made of aqueous solutions of salts with trivalent cations or with select bivalent cations excluding the alkaline earth metals, expediently containing water-miscible solvents, for extracting the inactivator from the organs.

In addition to the foregoing, German Patent No. 954,284 describes still another process for the recovery of the kallikrein-inactivator from lymphatic or parotid glands of ruminants, wherein the proteinaceous compounds are precipitated from the aqueous or acetic acid extracts of degreased and dried glands with trichloroacetic acid. The solutions of the inactivator are then adjusted to a weakly alkaline reaction and treated with an equal volume of alcohol, whereupon inactive substances in solution with the inactivator are precipitated, the filtrate is adjusted to pH 6.0 with acetic acid, concentrated in vacuo, extracted with ether, and the inactivator is finally precipitated by use of approximately ten times its amount of alcohol.

A further process for the recovery of the kallikrein-inactivator from lymphatic and parotid glands, pancreas, or blood has been described in German Patent No. 950,-959, whereby fat is first removed from the fresh organs by treatment twice with five times their volume of acetone, they are then extracted hot with dilute alcohol, and the extracts are concentrated in vacuo and shaken-out with ether. The inactivator is precipitated from the aqueous phase with alcohol, acetone or another organic solvent miscible with water, the precipitate is dissolved in dilute acetic acid, inactive matter present with the inactivator is removed by adjusting the solution to a weakly-alkaline condition, and the kallikrein-inactivator is precipitated once again with alcohol, acetone, or another organic solvent miscible with water.

German Patent No. 956,097 further teaches that the kallikrein-inactivator can also be recovered in a manner analogous to the foregoing from liver, spleen, or colostrum.

Still other processes for the recovery of the kallikrein-inactivator, particularly from the liver, have been described in German Patents Nos. 1,014,288 and 1,011,576. In accordance with the process of the former patent, ox liver is homogenized, extracted with dilute aqueous trichloroacetic acid which is removed by continuous extraction with ether. The inactivator is then precipitated with saturated ammonium sulphate solution, the precipitate is dissolved in water, and the inactivator is re-precipitated with picric acid. The resulting picrate is then decomposed with dilute acid, and this solution is then chromatographed by permitting it to pass first over a weakly basic ion-exchanger and then over a weakly acidic ion-exchanger, on which the inactivator is adsorbed for eventual elution therefrom by acid media.

In the process of the latter German Patent (No. 1,011,-576), the ammonia sulphate and picric acid precipitation is merely replaced by a precipitation stage effected with acidic acetone.

The present invention is based, at least in part, on the discovery that the kallikrein-inactivator can be precipitated from its solutions as a unique sparingly-soluble derivative through use of tannic acid within a pH range of from pH 2 to pH 10, the optimum precipitation being achieved in the pH range of from 4 to 8. In accordance with the process of the invention, it is immaterial whether or not free tannic acid is added to the solution of the inactivator and the mixture then neutralized with a sodium hydroxide solution, or the tannin solution is initially adjusted to the desired pH value and the inactivator precipitated with this tannate solution.

When pure inactivator preparations are employed, they exhibit a precipitation commencing at pH 3.0; 45 percent of the active substance being precipitated at pH 3.5, 71 percent at pH 4.0, 95–100 percent at pH 6.5, and 0 percent at pH 9.5.

When inactivator preparations of a lesser degree of purity are employed, they yield no further tannin precipitation at pH 8.5; the optimum likewise occurring at pH 6.5. On the other hand, however, with such less pure preparations of the inactivator, the yield does not decrease to 0 percent, but rather, a precipitate is still formed containing up to approximately 50 percent of the active substance. The yield drops to 0 percent only in more acidic solutions, namely, solutions having a pH value of approximately 2.

It has been demonstrated that the above-described precipitation with tannin is not an albumin precipitation, in that, the active substance can also be precipitated quantitatively from solutions which have previously been freed quantitatively from proteins by means of sulphosalicylic acid, trichloroacetic acid, perchloric acid or other typical albumin-precipitating agents. As will be readily appreciated, therefore, the process of the invention thus affords the opportunity for producing a protein-free, sparingly-soluble derivative of the kallikrein-inactivator.

Thus, the unique product obtained via the process of the invention is so sparingly-soluble that it does not dissolve in a buffer solution of pH 5.0 to 7.5, even following stirring for as long as two (2) hours. It can be readily suspended in water and, in this form, it is incapable of inactivating trypsin or kallikrein. In order to demonstrate its inactivator content biologically, it must first be split chemically as, for example, by dissolving it in 1 N hydrochloric acid and separating the inactivator from the tannic acid by precipitation with acetone. This acetone precipitate then contains the total amount of the active inactivator.

Significantly, the living organism is similarly capable of splitting the sparingly-soluble derivative in this manner. If, for example, an aqueous suspension of the inactivator-tannic acid derivative is administered to a guinea pig by subcutaneous injection, the splitting and subsequent resorption of the inactivator can be demonstrated on the fibrinolysis-inhibitor test. Additionally, since this splitting entails a time reaction, the inactivator is liberated only gradually. Accordingly, a protracted action is thus achieved, the duration of which amounts to a multiple of that of the same dose of an aqueous inactivator solution. As will be readily appreciated to the skilled technician, this "depot" effect is of substantial importance for therapeutic purposes, and, in this same connection, the local and general compatibility of the preparations of the invention is good.

The precipitation with tannic acid, with subsequent splitting, for example, with acid and acetone, is at the same time a purification measure. Thus, for example, when starting from an inactivator preparation having a degree of purity of 0.33 γ/KIU, a product with a degree of purity of 0.2 γ/KIU is obtained after precipitation with tannic acid and splitting with hydrochloric acid/acetone; 40 percent of the ineffective accompanying substances thus having been removed. Similarly, when starting from a preparation having a degree of purity of 16 γ/KIU, an end product of purity 8.8 γ/KIU is obtained, which means that the degree of purity is approximately doubled.

For therapeutic applications, an aqueous suspension of the sparingly-soluble derivative of the invention can be sealed into ampules, ready for injection. The suspension can also be lyophilized within the ampule in the presence of a suitable carrier substance as, for example, cane sugar or glycocoll. In situations in which extremely high demands are made with respect to the stability of the derivative such as, for example, for use in the tropics, it is also possible to prepare two ampules, one of which contains a solution of the precipitating agent, and the other containing the inactivator. When the content of the ampule for precipitation is injected into the inactivator ampule, the desired precipitate is formed instantaneously. Another technique involves that in which an aqueous solution of the inactivator and that of the precipitating agent are lyophilized in stratified relationship one upon the other in a single ampule (see German Patent No. 1,011,575).

It is believed that the foregoing principles and procedures may be best understood by reference to the follow specific examples illustrating typical applications of the process of the invention in the production of the unique sparingly-soluble KI derivative of the invention.

*Example I*

Fifty (50) cubic centimeters of a solution of the kallikrein-inactivator, prepared from lung and containing for each cubic centimeter 60,000 KIU of a degree of purity of 0.3 γ/KIU, were treated with 10 cubic centimeters of a freshly-prepared 10 percent tannic acid solution, and then with 1 cubic centimeter of a 1 N sodium hydroxide solution, with stirring. The precipitate formed was separated by centrifuging and washed three times with 25 cubic centimeters of redistilled water each time. The precipitate was then suspended in 100 cubic centimeters of redistilled water, and a finely-divided suspension was formed. The biological examination of the precipitate, following decomposition with hydrochloric acid and precipitation with acetone, yielded 2.85 millions of KIU, i.e., a yield of 95 percent.

*Example II*

One hundred (100) cubic centimeters of an aqueous inactivator solution, prepared from parotis and containing for every cubic centimeter 4400 KIU with a degree of purity of 0.22 γ/KIU, were treated while stirring with 1.7 cubic centimeters of a 10 percent tannic acid solution. A 1 N sodium hydroxide solution, in amount of 0.17 cubic centimeter, was then added with a pH of 6.5 being attained. The resulting precipitate was separated by centrifuging, and the clear excess was found to contain less than 5 percent of the active substance. The residue was washed twice with 25 cubic centimeters of redistilled water each time. It contained 87 percent of the active substance, i.e., 383,000 KIU.

*Example III*

One million units of an aqueous solution of the kallikrein-inactivator, prepared from pancreas and having a degree of purity of 0.22 γ/KIU, were precipitated with 5 cubic centimeters of a tannic acid solution of pH 6.6. For the preparation of the precipitating agent, 25 cubic centimeters of a 10 percent tannic acid solution were treated with 2.5 cubic centimeters of a 1 N sodium hydroxide solution. The precipitate was separated and washed twice with 25 cubic centimeters of redistilled water each time. It contained 940,000 KIU, i.e., 95 percent of the amount employed. The degree of purity of the preparation, following splitting with hydrochloric acid and acetone, amounted to 0.18 γ/KIU.

The precipitate was suspended within 47 cubic centimeters of a pyrogen-free physiological common salt solution. It contained 20,000 KIU/cc. and was found to be lyophilizable, if desired.

*Example IV*

Ten (10) grams of a kallikrein-inactivator preparation, produced from parotis and having a degree of purity of 15.2 γ/KIU (625,000 KIU), were dissolved in 100 cubic centimeters of redistilled water. A 10 percent tannic acid solution, in amount of 40 cubic centimeters, were added to the solution with stirring, followed by a sufficient amount of a 1 N sodium hydroxide solution to attain a pH value of 6.5. The thick precipitate thus produced was separated and washed twice with 100 cubic centimeters of redistilled water each time. The residue contained 90 percent of the activity of the starting material, i.e. 562,000 KIU with a degree of purity of 8.8 γ/KIU.

What is claimed is:

1. Process for the production of a sparingly-soluble derivative of the kallikrein-inactivator that comprises, treating a solution containing said kallikrein-inactivator with tannic acid at a pH value within the range of from pH 2.0 to pH 10.0, and separating and recovering the resulting kallikrein-inactivator-containing precipitate.

2. Process for the production of a sparingly-soluble derivative of the kallikrein-inactivator that comprises, treating a solution containing said kallikrein-inactivator with tannic acid at a pH value within the range of from pH 4.0 to pH 8.0, and separating and recovering the resulting kallikrein-inactivator-containing precipitate.

3. Process for the production of substantially pure preparations of the kallikrein-inactivator that comprises, treating a solution containing said kallikrein-inactivator with tannic acid at a pH value within the range of from pH 2.0 to pH 10.0, separating the resulting kallikrein-inactivator-containing precipitate from said solution, splitting said tannic acid kallikrein-inactivator precipitate by treating the same with an acid reagent, and precipitating the kallikrein-inactivator by means of a water miscible organic solvent.

4. The process as claimed in claim 3, wherein said treatment of the kallikrein-inactivator solution with tannic acid is effected at a pH value within the range of from pH 4.0 to pH 8.0.

5. The process as claimed in claim 3, wherein said tannic acid kallikrein-inactivator precipitate is chemically split by treatment with a solution of hydrochloric acid, and the kallikrein-inactivator is precipitated in pure form by treatment with acetone.

6. As a new composition of matter, a sparingly-soluble derivative of the kallikrein-inactivator precipitated from solutions of said inactivator by treatment of the same with tannic acid at a pH value within the range of from pH 2.0 to pH 10.0.

References Cited

UNITED STATES PATENTS 2,890,986  6/1959  Kraut et al. _____ 167—74

ALBERT T. MEYERS, *Primary Examiner.*

LEROY B. RANDALL, *Assistant Examiner.*